United States Patent
Eatough (10) Patent No.: US 8,601,542 B1
(45) Date of Patent: Dec. 3, 2013

(54) SYSTEMS AND METHODS PROVIDING FOR CONFIGURATION FILE DOWNLOADS

(75) Inventor: David A. Eatough, Snoqualmie, WA (US)

(73) Assignee: Crimson Corporation, Dover, DE (US)

( * ) Notice: Subject to any disclaimer, the term of this patent is extended or adjusted under 35 U.S.C. 154(b) by 1370 days.

(21) Appl. No.: 12/341,756

(22) Filed: Dec. 22, 2008

Related U.S. Application Data (60) Provisional application No. 61/017,475, filed on Dec. 28, 2007.

(51) Int. Cl.
*G06F 7/04* (2006.01)
*G06F 17/30* (2006.01)
*G06F 15/16* (2006.01)
*H04L 29/06* (2006.01)

(52) U.S. Cl.
USPC ............. 726/3; 726/2; 709/212; 709/216; 709/217; 709/218; 709/219

(58) Field of Classification Search
USPC .......... 726/2, 3; 709/217, 218, 219; 717/100, 717/101, 103
See application file for complete search history.

(56) References Cited

U.S. PATENT DOCUMENTS

| | | | |
|---|---|---|---|
| 7,062,750 B2 * | 6/2006 | Whidby et al. | 717/103 |
| 7,120,675 B1 * | 10/2006 | Shupak et al. | 709/217 |
| 7,193,974 B2 * | 3/2007 | Eatough et al. | 370/254 |
| 7,299,246 B1 | 11/2007 | Eatough | |
| 7,356,578 B1 | 4/2008 | Eatough | |
| 7,499,905 B2 * | 3/2009 | Jaschek et al. | 1/1 |
| 7,519,656 B2 * | 4/2009 | Yamaguchi et al. | 709/203 |
| 7,529,778 B1 * | 5/2009 | Dewey et al. | 1/1 |
| 7,529,809 B1 * | 5/2009 | Eatough et al. | 709/218 |
| 2002/0110084 A1 | 8/2002 | Butt et al. | |
| 2003/0009587 A1 * | 1/2003 | Harrow et al. | 709/238 |
| 2003/0039215 A1 | 2/2003 | Eatough et al. | |
| 2003/0041091 A1 * | 2/2003 | Cheline et al. | 709/200 |
| 2003/0084132 A1 * | 5/2003 | Ohta | 709/221 |
| 2003/0110264 A1 * | 6/2003 | Whidby et al. | 709/227 |
| 2003/0187931 A1 | 10/2003 | Olsen et al. | |
| 2003/0195921 A1 * | 10/2003 | Becker et al. | 709/200 |
| 2005/0138137 A1 * | 6/2005 | Encarnacion et al. | 709/217 |
| 2006/0117063 A1 * | 6/2006 | Havewala et al. | 707/104.1 |

* cited by examiner

*Primary Examiner* — Tae Kim
(74) *Attorney, Agent, or Firm* — Austin Rapp & Hardman (57) ABSTRACT

A computer-implemented method providing for configuration file downloads is disclosed. A first resource path is built. The first resource path may comprise a root component, a group component, and a time component based on a rounded time. Any computer systems within a group of the computer systems that have previously downloaded or are currently downloading a configuration file for the rounded time are identified. If any such computer system is identified, a copy of the configuration file is obtained from one of the identified computer systems. Otherwise, the configuration file is requested for the rounded time from a source. The source may generate the configuration file based on policies for the group of computer systems identified by the group component. The configuration file may then be downloaded.

21 Claims, 7 Drawing Sheets

SYSTEMS AND METHODS PROVIDING FOR CONFIGURATION FILE DOWNLOADS

RELATED APPLICATIONS

This application is related to and claims priority from U.S. Provisional Patent Application Ser. No. 61/017,475, filed Dec. 28, 2007, for "MULTICAST DOMAIN BASED POLICY/CONFIGURATION DOWNLOADS," with inventor David E. Eatough, which is incorporated herein by reference.

TECHNICAL FIELD

The present invention relates generally to computers and computer-related technology. More specifically, the present invention relates to systems and methods providing for configuration file downloads.

BACKGROUND

Computer and communication technologies continue to advance at a rapid pace. Indeed, computer and communication technologies are involved in many aspects of a person's day. Computers include everything from hand-held computing devices to large multi-processor computer systems.

Computers are used in almost all aspects of business, industry, and academic endeavors. More and more homes are using computers as well. The pervasiveness of computers has been accelerated by the increased use of computer networks, including the Internet. Most companies have one or more computer networks and also make extensive use of the Internet. The productivity of employees often requires human and computer interaction. Improvements in computers and software have been a force for bringing about great increases in business and industrial productivity.

Maintaining and supporting computer systems is important to anyone who relies on computers. Whether a computer or computing device is in a home or at a business, at least some maintenance and/or support is often needed. For example, sometimes there are problems with computer hardware. In addition, computer hardware is often upgraded and replaced with new components. Similarly, computer software is also frequently upgraded or replaced. New computer hardware and software are continually being integrated into systems across the world.

Installing new computer hardware and/or software, or fixing problems with existing systems, may cause down-time during which the business or individual operates at a diminished level. Most individuals and businesses try to minimize computer problems so as to avoid down-time. Managing the constant barrage of software upgrades and updates can be time consuming and overwhelming to both computer users and network administrators.

As corporate performance and end-user productivity have become increasingly dependent on computers, computer support personnel are continuously under pressure to accomplish more with existing or reduced staff head counts. They are also under pressure to perform tasks as efficiently as possible.

As shown from the above discussion, there is a need for systems and methods that will improve the ability to manage and support computer systems. Improved systems and methods may enable a person performing computer support to work more efficiently and accomplish more in less time. Benefits may be realized by providing increased functionality to assist in computer maintenance and support.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

A computer-implemented method providing for configuration file downloads is disclosed. A first resource path may be built. The first resource path may comprise a root component, a group component, and a time component based on a rounded time. Any computer systems within a group of computer systems that has previously downloaded or is currently downloading the configuration file for the rounded time is identified. If one of the computer systems is identified, a copy of the configuration file is obtained from the identified computer system. If one of the computer systems is not identified, then the configuration file for the rounded time is requested from a source. The source generates the configuration file based on policies for the group of computer systems identified by the group component. In one embodiment, the policies contained in the configuration file are processed.

The root component may identify a location at the source. A processing application located at a second resource path, in one embodiment, may be requested to generate the policies for the group of computer systems. The second resource path may comprise the root component.

The first resource path may point to a computer system outside the group of computer systems and may comprise a universal resource locator (URL). The rounded time may be based on a specified rounding interval. Identifying any computer systems within the group of computer systems may comprise searching within the group of computer systems for the configuration file using the rounded time.

A computer system providing for configuration file downloads is also disclosed. The system may include a processor, memory in electronic communication with the processor, and instructions stored in the memory. The instructions may be executable to build a first resource path. The instructions may further be executable to identify any computer systems within a group of computer systems that have previously downloaded or are currently downloading the configuration file for the rounded time. In one embodiment, if one of the computer systems is identified, the instructions may be executable to obtain a copy of the configuration file from the identified computer system. If one of the computer systems is not identified, the instructions may be executable to request the configuration file for the rounded time from a source. The source may generate the configuration file based on policies for the group of computer systems identified by the group component. In one embodiment, the instructions may be executable to download the configuration file generated by the source utilizing the identified policies. Also, the instructions may be further executable to process the policies contained in the configuration file.

In some embodiments, the instructions are further executable to process the policies contained in the configuration file. Also, the instructions executable to identify any computer systems within the group of computer systems may include instructions executable to search within the group of computer systems for the configuration file using the rounded time.

A computer-readable medium comprising executable instructions providing for configuration file downloads is also disclosed. The executable instructions may comprise one or more of the instructions identified above.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

Figure 1:
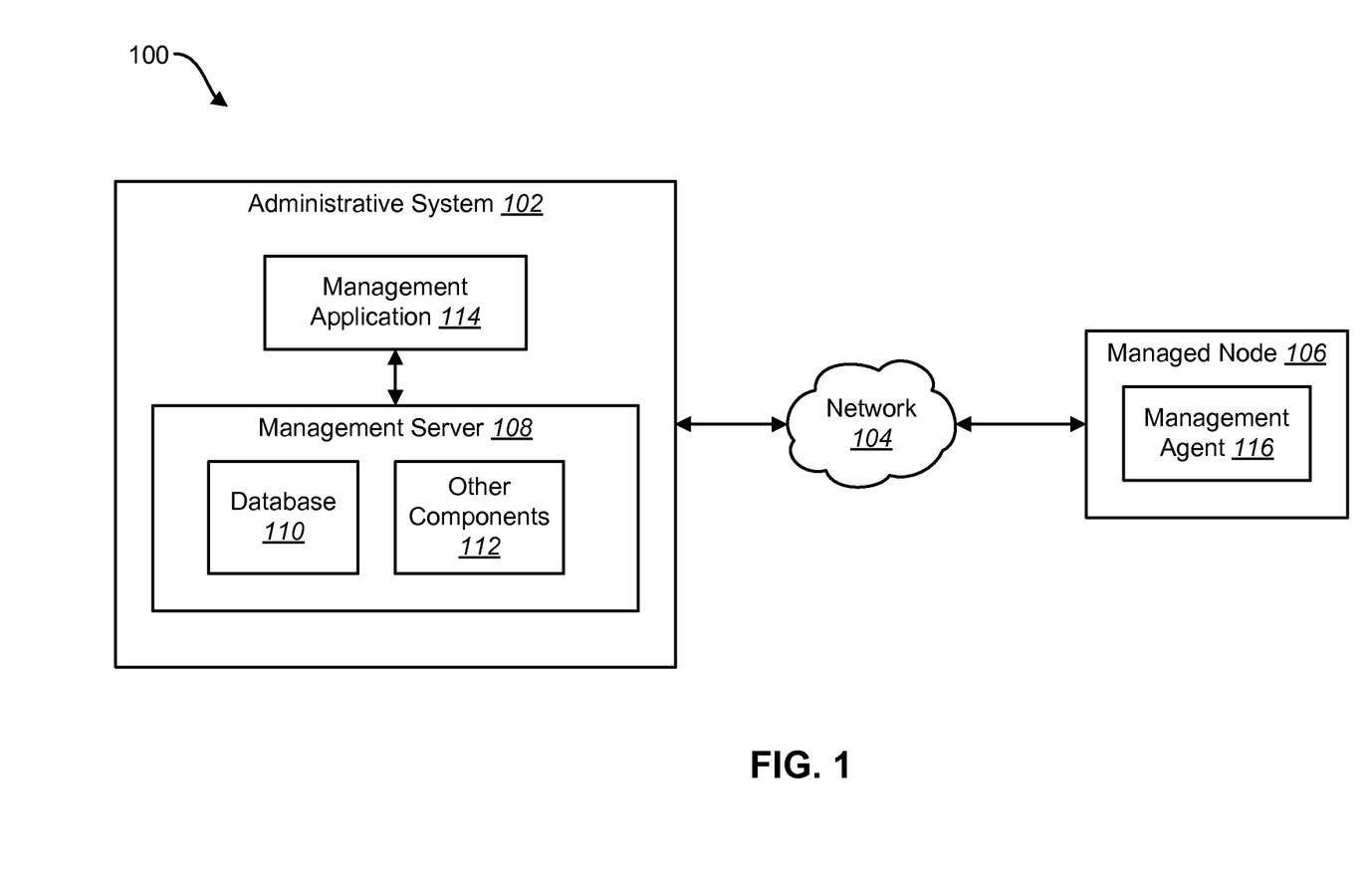
FIG. 1 illustrates an exemplary system in which some embodiments may be practiced, the system including an administrative system and a managed node.

FIG. 1 illustrates an exemplary system 100 in which some embodiments may be practiced. An administrative computer system 102 is connected to a computer network 104, such as a corporate local area network (LAN). The administrative system 102 is used to manage other computer systems that are also connected to the computer network 104. These other computer systems will be referred to herein as "managed nodes." For simplicity, only a single managed node 106 is shown in the system 100 of FIG. 1. Of course, the systems in which embodiments disclosed herein are practiced may include many additional managed nodes.

The administrative system 102 includes a management server 108. The management server 108 includes a database 110 of information. The management server 108 also includes various other components 112 that are configured to perform tasks such as scheduling, handling alerts, and so forth. An example of a management server 108 that may be used with embodiments disclosed herein is the core server for the LANDesk® Management Suite.

The administrative system 102 also includes a management application 114. The management application 114 may be used to perform various tasks related to the management of the computer network 104, such as remote control, software distribution, software license monitoring, operating system imaging and migration, IT asset management, problem resolution, and so forth. As part of performing these tasks, the management application 114 may connect to the management server 108 and query the management server 108 for information. An example of a management application 114 that may be used is the console application for the LANDesk® Management Suite. Although a management server 108 is shown in the embodiment depicted in FIG. 1, not all embodiments require a management server 108.

To enable a user of the administrative system 102 to perform management tasks via the management application 114, the managed node 106 includes a management agent 116. The management agent 116 performs management-related tasks in response to requests from the management application 114 or may perform management-related tasks independent of the management application 114. An example of a management agent 116 that may be used is the LANDesk® Management Agent.

Figure 2:
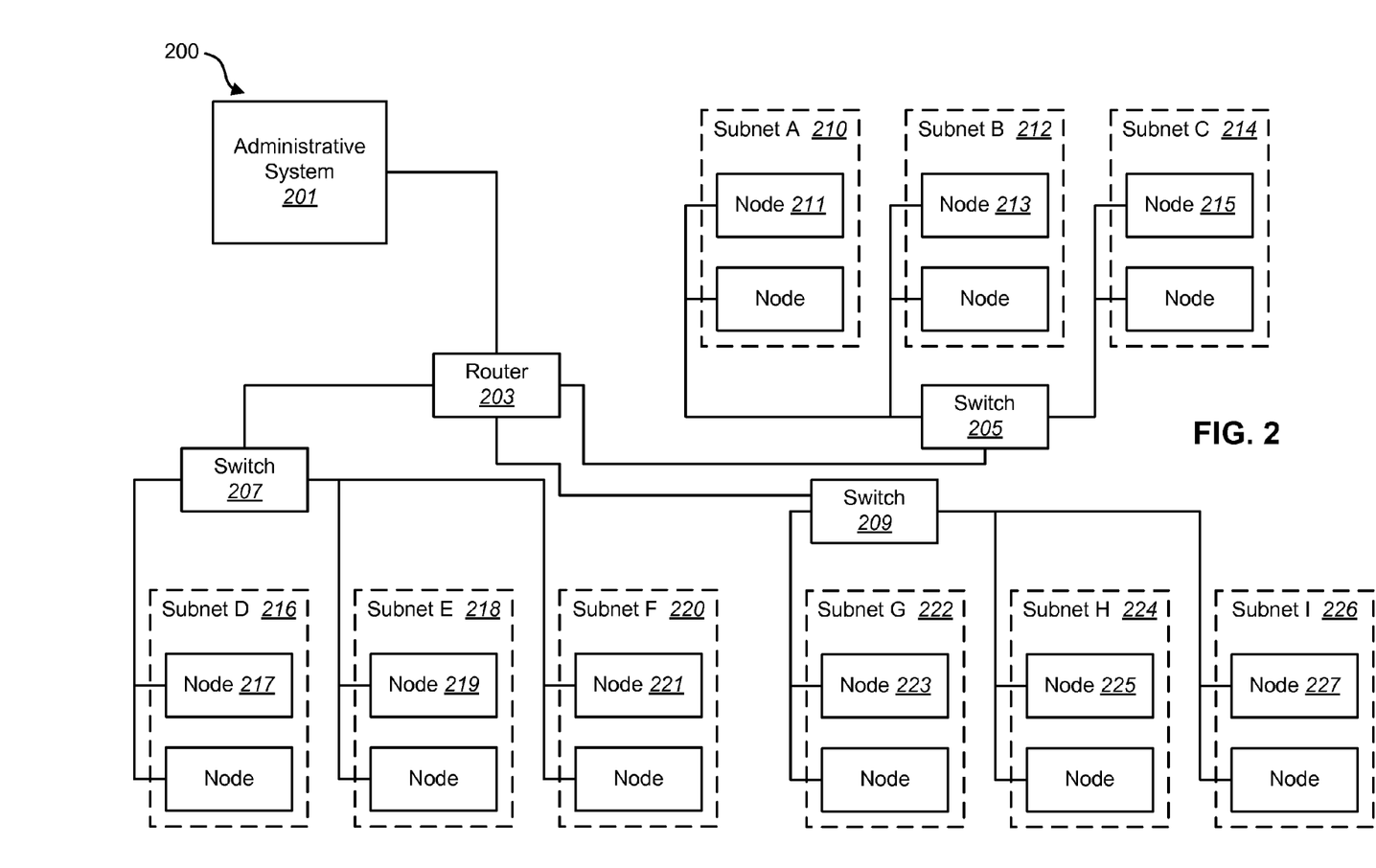
FIG. 2 illustrates a computer network on which the present systems and methods may be implemented.

FIG. 2 illustrates a computer network 200 on which the present systems and methods may be implemented. In FIG. 2, an administrative system 201 connects to a router 203. The router 203 is connected to three switches: a first switch 205, a second switch 207, and a third switch 209. Each switch 205, 207, 209 connects to three subnets. The first switch 205 connects to three subnets: subnet A 210, subnet B 212, and subnet C 214. The second switch 207 connects to three subnets: subnet D 216, subnet E 218, and subnet F 220. The third switch 209 connects to three subnets: subnet G 222, subnet H 224, and subnet I 226. Each subnet includes one or more managed nodes. The managed nodes 211, 213, 215, 217, 219, 221, 223, 225, and 227 represent computer systems or devices on the computer network.

Figure 3:
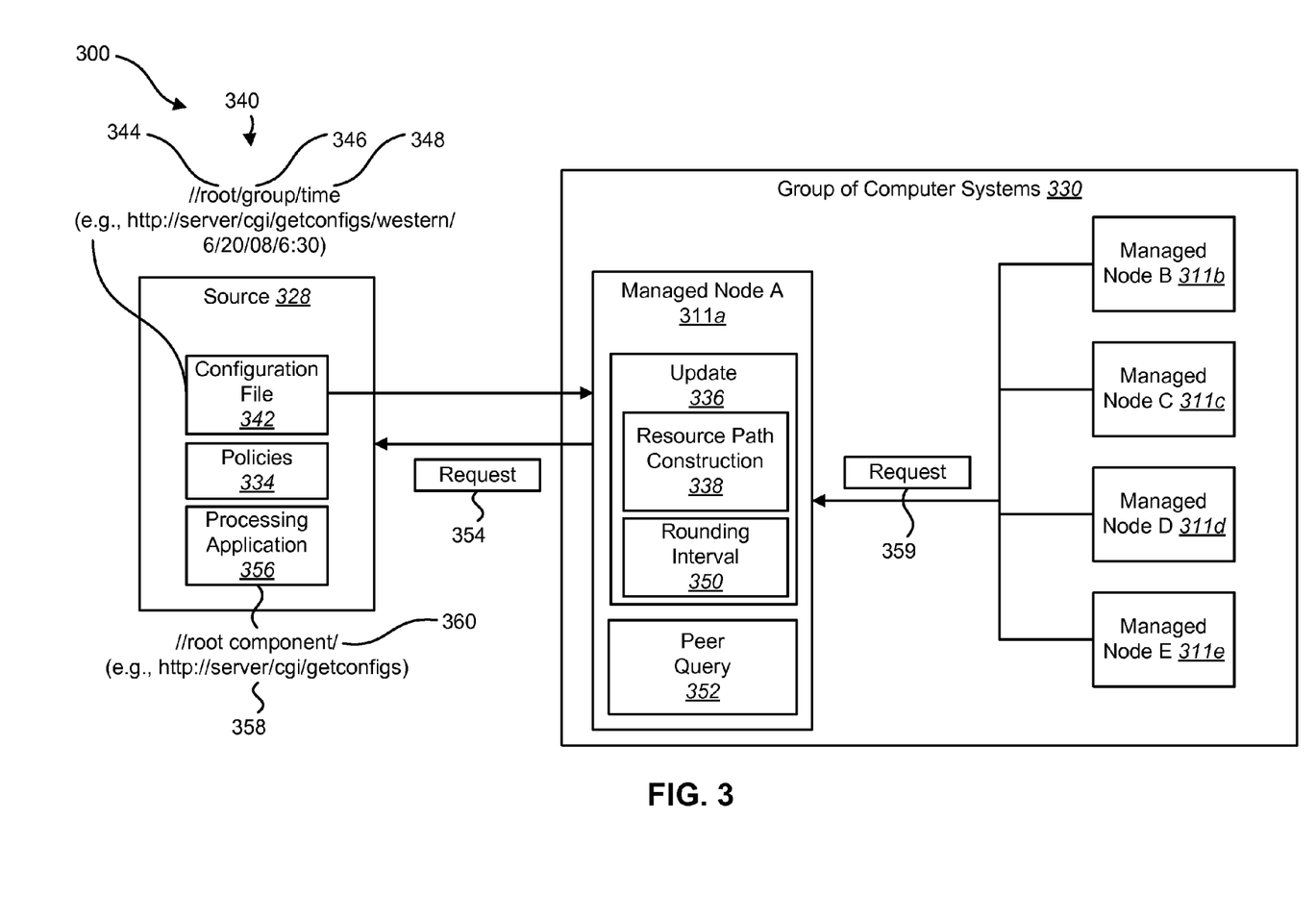
FIG. 3 illustrates one embodiment of a system providing for configuration file downloads.

FIG. 3 is a block diagram of one embodiment of a system 300 providing for configuration file downloads. This system 300 includes a source 328 and a group of computer systems 330. The source 328 may be one or more servers, such as the administrative system 102 of FIG. 1, or any other type of computer system in electronic communication with one or more of the managed nodes 311a-e in the group of computer systems 330. The source 328 may be outside the group of computer systems 330, as illustrated in FIG. 3, or, alternatively, within the group of computer systems 330.

The group of computer systems 330, which, in one embodiment, may comprise a subnet, includes a number of managed nodes 311a-e. The number of managed nodes 311a-e within each group 330 and also the number of groups 330 may be varied within the scope of the disclosed systems and methods. In some alternative embodiments, the group of computer systems 330 may comprise a multicast alias domain. A multicast alias domain includes of all the nodes 311a-e that can see each other's multicast traffic without crossing a router 203.

The source 328 may include a number of policies 334 related to the group of computer systems 330. The policies 334 may include alerts, computer program updates, configuration settings, or files otherwise for use by the managed nodes 311a-e. An update component 336 of one of the managed nodes 311a assists in updating the managed nodes 311b-e with configuration file downloads.

In one embodiment, the updating component 336 may include a resource path construction component 338. The resource path construction component 338 builds a first resource path 340. The resource path construction component 338 may build the first resource path 340 directly or indirectly (such as via the source 328 or other computer system). The resource path 340 may be, for example, a universal resource locator (URL) or other type of file path. The resource path construction component 338 could operate or be physically present at other locations, such as at the source 328 or at another node 311b-e. Also, the resource path construction component 338 could, in one embodiment, work in conjunction with the processing application 356 of the source 328 to build the first resource path 340.

The processing application 356, in one embodiment, builds or updates a configuration file 342 at periodic intervals or when triggered by a request or another event. The configuration file 342 includes policies 334 for one or more of the managed nodes 311a-e.

The configuration file 342 may be stored at the first resource path 340. The first resource path 340 comprises a root component 344, a group component 346, and a time component 348. The root component 344 may indicate a file location or path on the source 328 which can be accessed by one or more of the managed nodes 311a-e. The group component 346 comprises a name, acronym, or other indicator referring to the group of computer systems 330. As a result, each different group of computer systems 330 that accesses the source 328 may have a different group component name. The time component 348 may include a month, day, year, hours minutes, seconds, portions of the second, or one or more of the foregoing. The rounded time is rounded to a specified rounding interval 350, such as to the nearest 10-minute interval or the nearest minute, hour, or day relative to the current time.

The peer query component 352 may send requests 359 to other managed nodes 311b-e within the group of computer systems 330 to determine whether these managed nodes 311b-e have downloaded or are in the process of downloading a configuration file 342 from the source 328. The peer query component 352 may also facilitate or effectuate obtaining a configuration file 342 from other managed nodes 311a-e. The update component 336 and peer query component 352 may, in one embodiment, comprise portions of the management agent 116 of FIG. 1.

The processing application 356 queries for recent policies 334 related to or for use by the group of computer systems 330 (using the group component 346) in response to a request 354 from the first managed node 311a as shown in FIG. 3, or from other nodes 311b-e. The policies 334 may be obtained from or stored on other computer systems besides the source 328. When policies 334 have been identified through these queries, the processing application 356 builds a configuration file 342 based on the identified policies 334. As noted above, in one embodiment, the processing application 356 of the source 328 may work in conjunction with the resource path construction component 338 to build the configuration file 342. For example, the resource path construction component 338 could formulate the path for the configuration file 342 and the processing application 356 could identify and incorporate pertinent policies 334 into the configuration file 342.

The processing application 356 may comprise, for example, a common gateway interface (CGI) or internal server application programming interface (ISAPI). The processing application 356 is located at a second file path 358 comprising the root component 360.

After the configuration file 342 is built, it is downloaded to the first managed node 311a. Thereafter, the first managed node 311a may implement or install the policies 334 indicated by the configuration file 342, using, for example, the management agent 116 illustrated in FIG. 1.

In one embodiment, after receipt of the configuration file 342, the first managed node 311a may transmit the configuration file 342 to the other managed nodes 311b-e in response to requests 359 from other managed nodes 311b-e or, alternatively, may transmit the configuration file 342 to other nodes 311b-e in the absence of such a request 359. This procedure minimizes network traffic between the group of computer systems 330 and the source 328.

Use of a rounded time also enables minimal bandwidth usage between the managed nodes 311a-e and the source 328. For example, if, after the configuration file 342 has been downloaded to one of the managed nodes 311a-e, another managed node 311a-e sends a request 354 to the source 328, the processing application 356 of the source 328 may send a reply indicating that a first resource path 340 has already been built for the specified rounding interval 350 (e.g., within the most recent interval). As a result, the pertinent managed node 311a-e may instead request the configuration file 342 from other managed nodes 311a-e within the group of computer systems 330 rather than downloading it from the source 328.

In one embodiment, the managed nodes 311a-e could directly examine accessible resource paths at the source 328 under the pertinent group component 346 of the first resource path 340 to determine whether a configuration file 342 has been downloaded from the source 328 within the specified rounding interval 350. Also, managed nodes 311a-e could simply query other nodes 311a-e or look within a local cache (or other specified file location) for files containing or referenced by the group component 346 and/or time component 348. Again, when a configuration file 342 within the specified rounding interval 350 is found, it may be obtained directly from such a location without utilizing the source 328.

It should also be noted that use of a rounded time enables efficient use of the resources of the source 328 because a configuration file 342 only needs to be created by the processing application 456 at periodic intervals. Thus, the disclosed systems and methods enable several resources to be used efficiently: the processing capabilities of the source 328 and the bandwidth between the source 328 and the group of managed nodes 330.

In one embodiment, each managed node 311a-e will download the configuration file 342 periodically to make sure that the managed node 311a-e has all of the applicable policies 334. The resource path construction component 338 constructs the first resource path 340 by combining a root component 344, a group component 346 (for the group of computer systems 330), and a rounded time component 348.

As an example, the managed nodes 331a-e may have the same group component 346 (e.g., western). The first managed node 331a may be the first of the nodes 331a-e to build the first resource path 340. At 6:31 a.m., for example, the first managed node 331a may build a configuration file path, the first resource path 340, based on the template "http://server/ cgi/getconfigs/<location>/<rounded time>". For example, if the time is rounded in ten minutes increments, the file path "http://server/cgi/getconfigs/western/630" may be built.

The first managed node 331a may then perform the download using a subnet aware download whereby the first managed node 331a first requests the configuration file 342 for the pertinent rounded time from the group of computer systems 330. If none of the other nodes 331a-e have the configuration file 342, the first managed node 331 will go to the source 328 to download the file 342.

Continuing with this example, the second managed node 331b may attempt to download the configuration file 342 at 6:32 a.m. and builds the same path as the first managed node 331a ("http://server/cgi/getconfigs/western/630") because the time component 348 is rounded. The second managed node 331b sends a request 359 other nodes 331a, 331c-e within the group of computer systems 330. The first managed node 331a may then indicate that it can provide the file 342, and the second managed node 331b obtains the file 342 from the first managed node 331a. This procedure saves bandwidth because the second managed node 331b did not have to go to the source 328 (which may be located over a wide-area network (WAN) or other limited-resource or slower connection—slower relative to connection speeds available between nodes 331a-e within the group of computer systems 330, in one embodiment). Also, the source 328 did not have to generate the configuration file 342 again.

Continuing on with this example, when a third managed node 331c attempts to obtain the file 342 at 6:39 a.m., the third managed node 331c may again generate the same resource path 340 and could obtain the file 342 from either the first or second managed node 331a-b. If a fourth managed node 331d were to attempt to download the file at 6:51 a.m., this managed node 331d may generate a file path "http://server/cgi/getconfigs/western/650," and will not find this file 342 on a peer node 331a-c, 331e and will instead go to the source 328. This approach allows the group of managed nodes 331a-e to ensure that they have a configuration file 342 that is not too stale, while minimizing the bandwidth usage to the source 328 and the amount of processing performed by the source 328.

It should be noted that the rounding procedure may be implemented in various ways. For example, if the rounding interval is 10 minutes and the current time is 6:56 a.m., the time could be rounded down to 6:50 a.m. or could be rouned up to 7:00 a.m.

Figure 4:
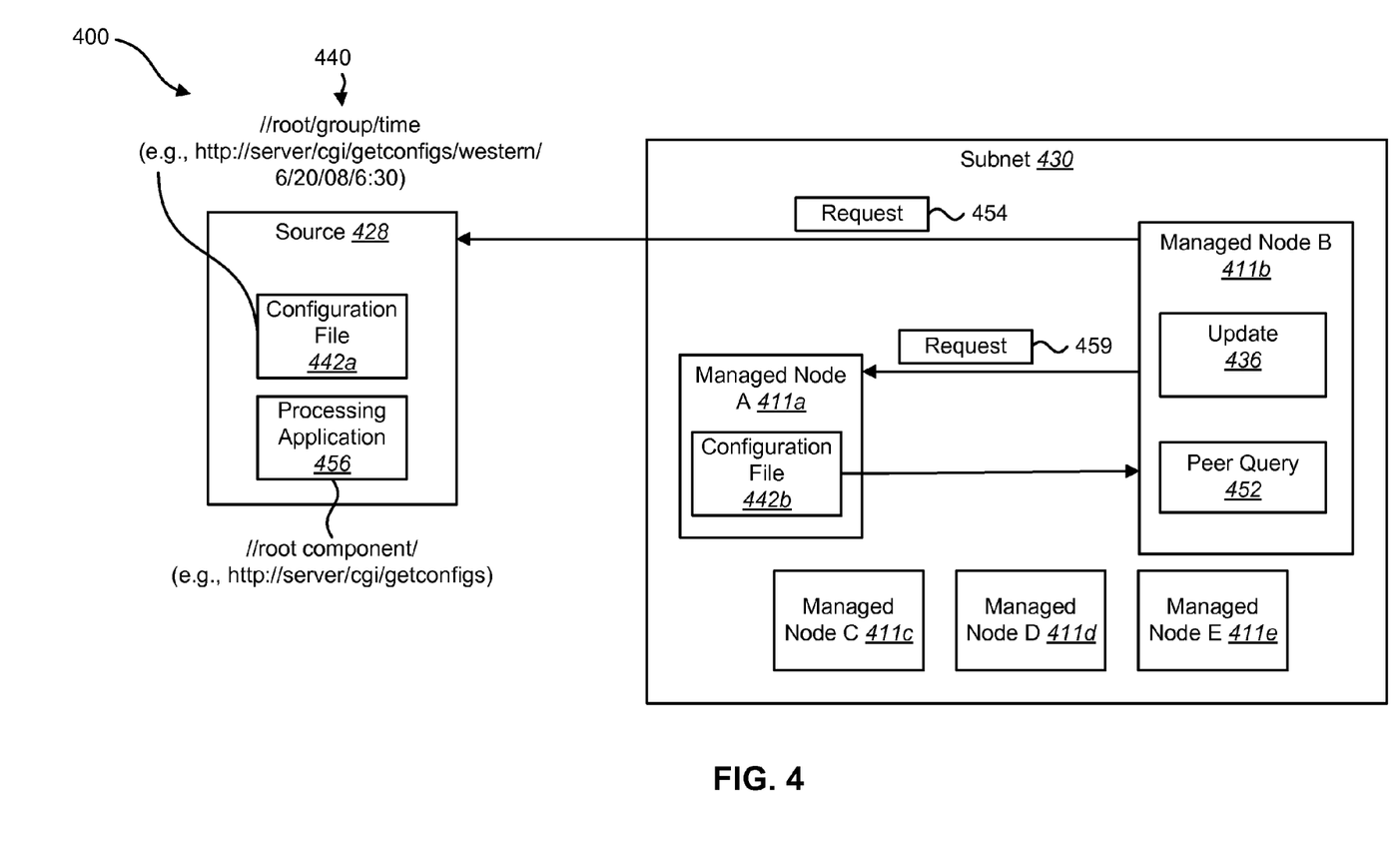
FIG. 4 illustrates another embodiment of a system providing for configuration file downloads.

FIG. 4 illustrates another embodiment of a system 400 providing for configuration file downloads. In the illustrated embodiment, managed node A 411a downloads the configuration file 442a from the source 428. An update component 436 of managed node B 411b transmits a request 454 for an update from the source 428. In response, a processing application 456 of the source 428 indicates that a first resource path 440 has been built within the specified rounding interval 350 (e.g., at the last specified internal). The peer query component 452 of managed node B 411b transmits a request 459 to one or more other managed nodes 411a, 411c-e within the subnet 430, including managed node A 411a. Thereafter, managed node A 411a transmits the configuration file 442b to managed node B 411b or otherwise notifies managed node B 411b that has stored or is downloading the configuration file 442b.

In an alternative embodiment, managed node B 411b may send a request 459 to other managed nodes 411a, 411c-e for the configuration file 442b before sending a request 454 to the source 428 to obtain a configuration file 442a. Also, as noted above, managed nodes 411a-e may directly examine resource paths 440 at the source 428 or at a specified location to determine whether a configuration file 442a has recently been downloaded from the source 428 to a node 411a-e within the subnet 430.

Figure 5:
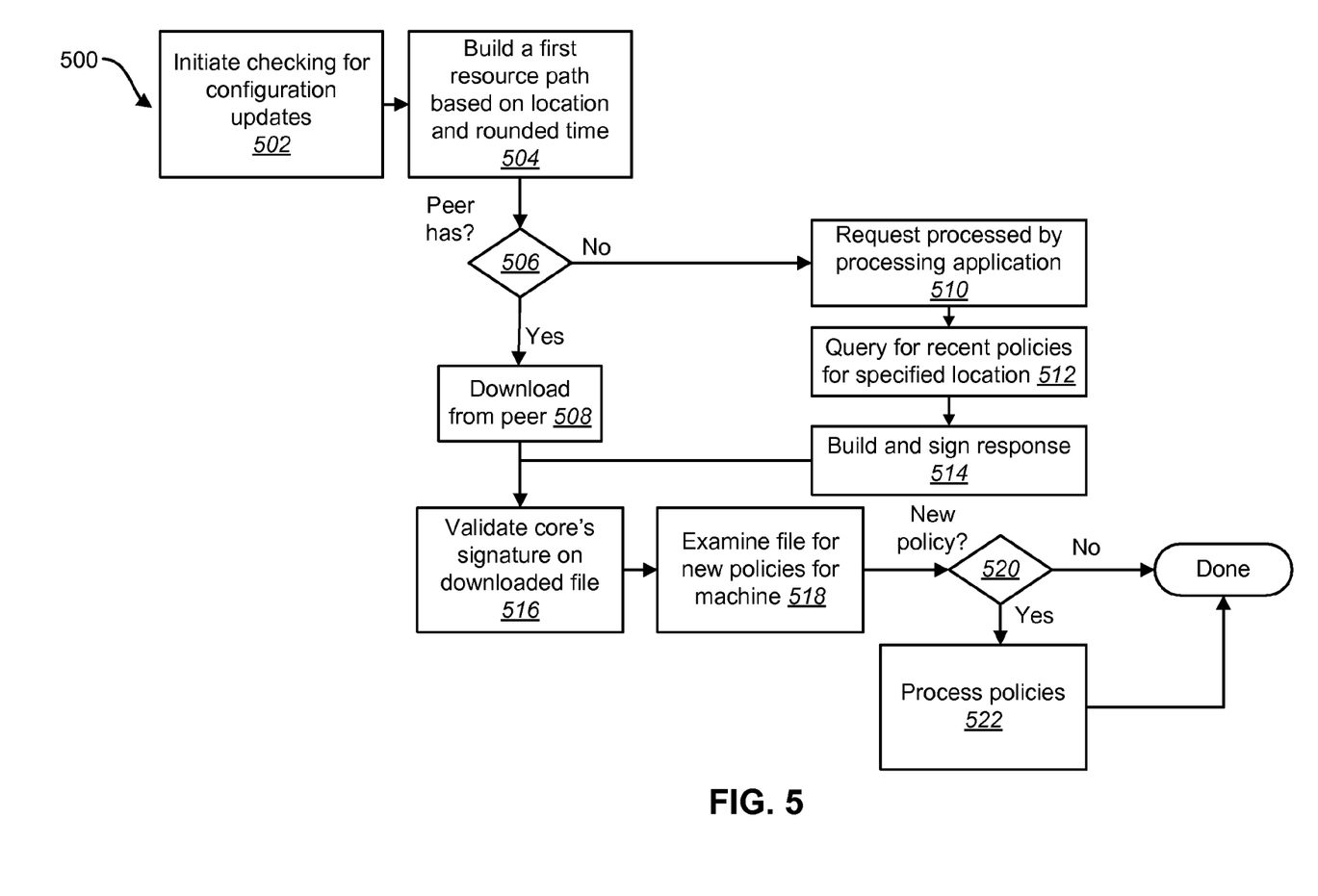
FIG. 5 illustrates one embodiment of a method providing for configuration file downloads.

With reference to FIG. 5, a flow chart illustrating one embodiment of a method 500 providing for configuration file downloads is illustrated. In accordance with a schedule or in response to an event or request, the process of checking for configuration updates is initiated 502. This process may be initiated 502 by one of the managed nodes 311a-e, by an administrative system 102 (shown in FIG. 1), or by any other system, for example, in accordance with a specified schedule or a user request.

A first resource path 440 is built 504 based on a location (e.g., a group identifier) and a rounded time. The resource path 340 may be, as an example only, a URL or other type of file path. The first resource path 340 may comprise a root component 344, a group component 346, and a time component 348. The root component 344 indicates the file path where a processing application 356 may be stored and/or accessed by nodes 311a-e within the group or groups of computer systems 330. The root component 344 could identify a particular server, computer system, administrative system 102 or any folder or sub folder within any such systems. The group component 346 identifies a particular group of computer systems 330, such as a subnet. The group component 346 may involve the actual name of the group, or an abbreviation or variation of the group name utilized for purposes of building a configuration file 342. As indicated previously, the time component 348 may involve a year, month, date, hours, minutes, seconds, etc. The time component 348 is rounded to a rounding interval 350 that may be specified for use by an administrator, user, or manufacturer.

Thereafter, it is determined 506 whether any node 311a-e within the group of computer systems 330 has previously downloaded, or is in the process of downloading, the configuration file 342 for the most recent rounding interval 350. If such a configuration file 342 has been downloaded, this file 342 is obtained 508 from the identified managed node 311a-e. If the configuration file 342 has not been obtained by such a node 311a-e, a request 510 is made to a server or computer system to obtain the configuration file 342.

The request may be processed 510 by a processing application 356, such as a CGI or ISAPI application. The processing application 356 that handles the request 510 may be located at a second resource path 360 defined by the root component 344. The processing application 356 utilizes the group component 346 to determine which location to examine for policies 334, which include, for example configuration information and/or other updates. Thereafter, a computer system queries 512 for recent policies 334 (e.g., within the last three or four hours) within the specified location or group.

A responsive document, a configuration file 342, may be built and signed 514 based on the identified policies 334. After downloading the file 508 (either from a managed node 411a-e or the source 428), the signature of the file 342 may be validated 516 to verify the authenticity of the file 342.

The configuration file 342 may be examined 518 to identify polices 334 for the pertinent node 311a-e. If a new policy 334 is found 520 for the pertinent node 311a-e, it is processed 522 (including implemented) utilizing, for example, a management agent 116 (shown in FIG. 1).

Figure 6:
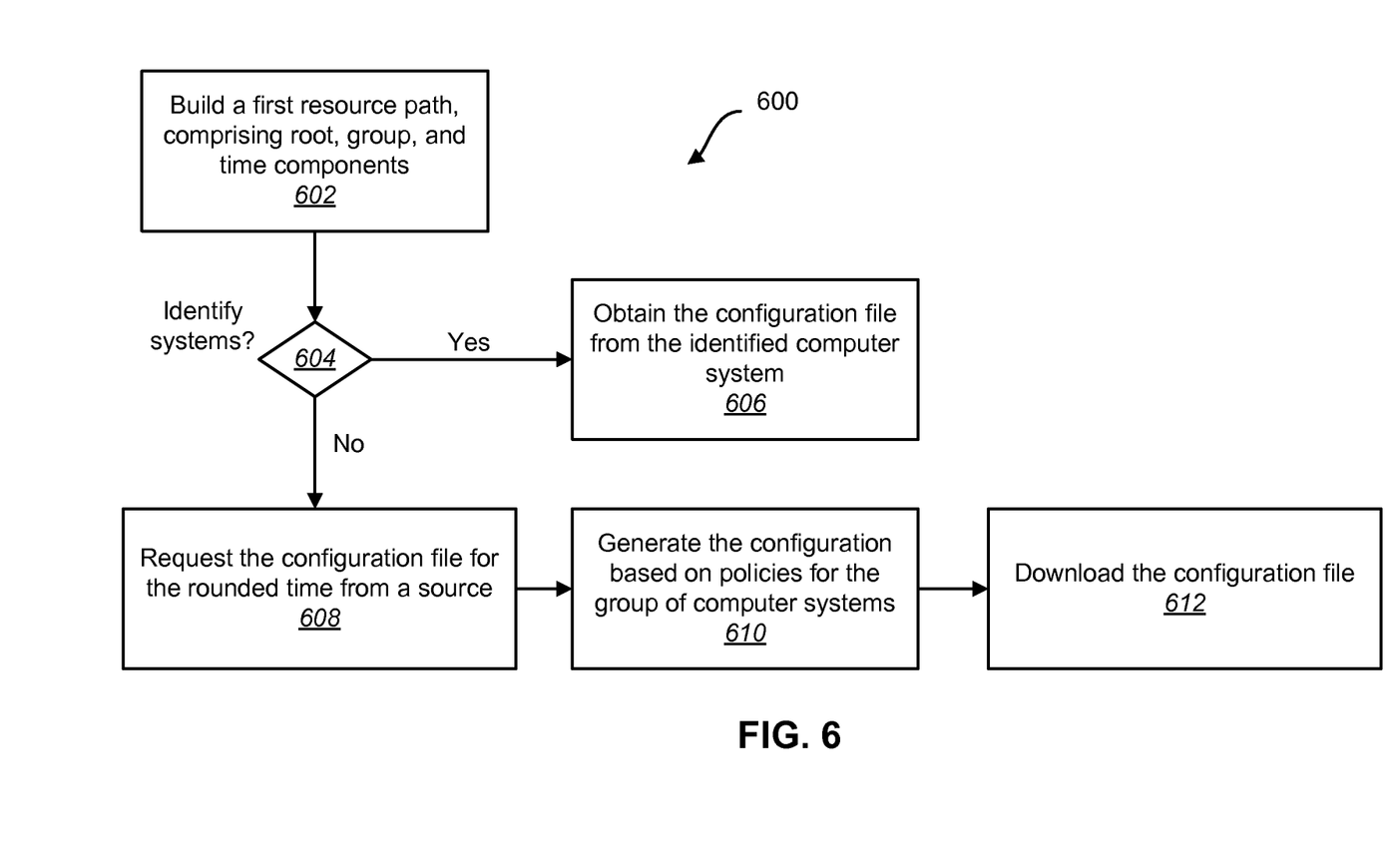
FIG. 6 illustrates another embodiment of a method providing for configuration file downloads.

FIG. 6 is a flow diagram illustrating another embodiment of a method 600 providing for configuration file downloads. A first resource path may be built 602. As noted, the first resource path 340 includes a root component 344, group component 346, and time component 348. In one embodiment, the first resource path 340 points a computer system outside the group of computer systems 330.

Computer systems 411*a-e* within the pertinent group 330 that have or are currently downloading the configuration file 342 for the rounded time indicated by the time component 348 are identified 604. Identifying 604 any computer systems 411*a-e* within the pertinent group 330 that have or are currently downloading the configuration file 342 may also include searching other nodes 311*a-e* within the group 330 for the configuration file 342 using the rounded time.

If a computer system 411*a-e* is identified 604 as has having downloaded or is currently downloading the configuration file 342, a copy of the configuration file 342 is obtained 606 from the identified computer system 411*a-e*. If no such system is identified 604, a configuration file 442*a* for the pertinent rounded time is requested 608 from a source 328. In response to such a request, at a specified interval, or at some other time, the configuration file is generated 610 (such as by a processing application 356 at the second resource path 360) based policies 334 for the group of computer systems 330 identified by the group component 346. The pertinent configuration file 342 may then downloaded 612 to the requesting node 311*a-e*.

Figure 7:
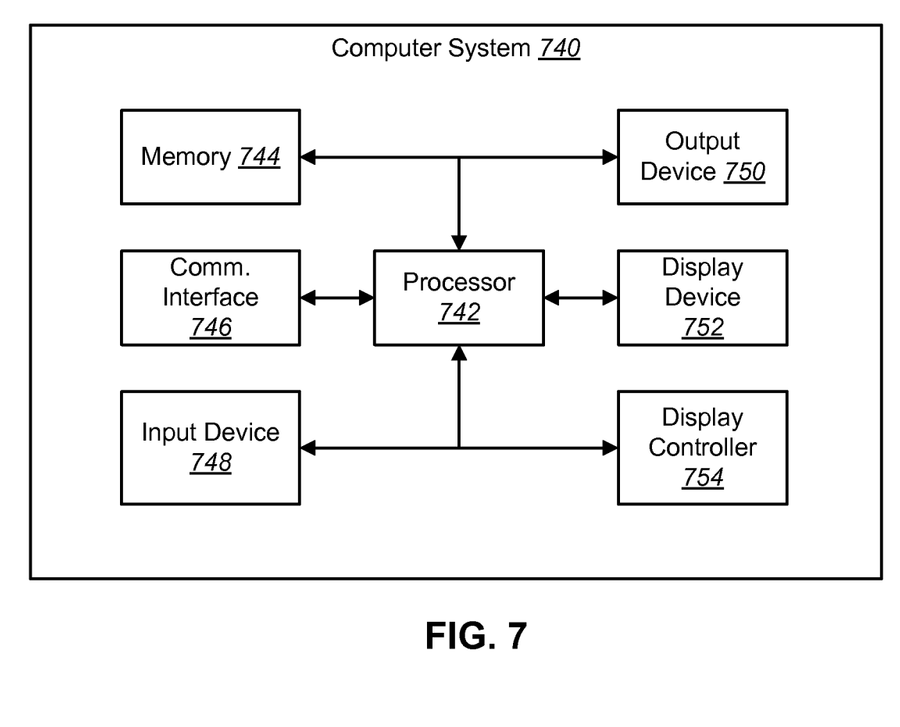
FIG. 7 is a block diagram illustrating the major hardware components typically utilized in a computer system.

FIG. 7 is a block diagram illustrating the major hardware components typically utilized in a computer system 740, such as a node 311*a-e* or a source 328. The illustrated components may be located within the same physical structure or in separate housings or structures.

The computer system 740 includes a processor 742 and memory 744. The processor 742 controls the operation of the computer system 740 and may be embodied as a microprocessor, a microcontroller, a digital signal processor (DSP), or other device known in the art. The processor 742 typically performs logical and arithmetic operations based on program instructions stored within the memory 744.

As used herein, the term memory 744 is broadly defined as any electronic component capable of storing electronic information, and may be embodied as read only memory (ROM), random access memory (RAM), magnetic disk storage media, optical storage media, flash memory devices in RAM, on-board memory included with the processor 742, EPROM memory, EEPROM memory, registers, etc. The memory 744 typically stores program instructions and other types of data. The program instructions may be executed by the processor 742 to implement some or all of the methods disclosed herein.

The computer system 740 typically also includes one or more communication interfaces 746 for communicating with other electronic devices. The communication interfaces 746 may be based on wired communication technology, wireless communication technology, or both. Examples of different types of communication interfaces 746 include a serial port, a parallel port, a Universal Serial Bus (USB), an Ethernet adapter, an IEEE bus interface, a small computer system interface (SCSI) bus interface, an infrared (IR) communication port, a Bluetooth wireless communication adapter, and so forth.

The computer system 740 typically also includes one or more input devices 748 and one or more output devices 750. Examples of different kinds of input devices 748 include a keyboard, mouse, microphone, remote control device, button, joystick, trackball, touchpad, lightpen, etc. Examples of different kinds of output devices 750 include a speaker, printer, etc. One specific type of output device which is typically included in a computer system 740 is a display device 752. Display devices 752 used with embodiments disclosed herein may utilize any suitable image projection technology, such as a cathode ray tube (CRT), liquid crystal display (LCD), light-emitting diode (LED), gas plasma, electroluminescence, or the like. A display controller 754 may also be provided, for converting data stored in the memory 744 into text, graphics, and/or moving images (as appropriate) shown on the display device 752.

Of course, FIG. 7 illustrates only one possible configuration of a computer system 740. Various other architectures and components may be utilized.

Various communication technologies may be used in embodiments disclosed herein. For example, multicast technology may be used to reach all machines with a multicast alias domain. Additional details about multicast domains are disclosed in U.S. Published Patent Application No. 2003/0039215, titled "Method and Apparatus for Dynamically Discovering Multicast Alias Domains," with inventors David A. Eatough and Gregory P. Olsen. This patent application is hereby incorporated by reference in its entirety. Additional details about how multicast technology may be used to download files from within the same subnet are disclosed in U.S. Published Patent Application No. 2003/0187931, titled "Facilitating Resource Access Using Prioritized Multicast Responses To A Discovery Request," with inventors Gregory P. Olsen and David A. Eatough, and U.S. Published Patent Application No. 2002/0110084, titled "Application Based Bandwidth Limiting Proxies," with inventors Alan B. Butt, David A. Eatough, and Tony N. Sarra. Both of these patent applications are hereby incorporated by reference in their entirety. Other communication technologies, such as broadcasts, may also be used. The discovery request could also be sent to all machines in the network using a point to point protocol.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configurations.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method providing for configuration file downloads, the method comprising:
    building, by a first computer, a first resource path, the first resource path comprising a root component, a group component, and a time component based on a rounded time, wherein the rounded time is based on an interval relative to the current time;
    identifying, by the first computer, any computer within a group of computers that have previously downloaded or are currently downloading a configuration file stored at the first resource path for the rounded time;
    if one of the computers is identified, obtaining a copy of the configuration file stored at the first resource path from the identified computer; and
    if one of the computers is not identified:
        requesting the configuration file for the rounded time from a source, the source generating the configuration file stored at the first resource path based on policies for the group of computers identified by the group component; and
        downloading the configuration file stored at the first resource path generated by the source utilizing the identified policies.

2. The method of claim 1, further comprising processing the policies included in the configuration file.

3. The method of claim 1, wherein the root component identifies a location at the source.

4. The method of claim 1, wherein a processing application located at a second resource path is requested to generate the configuration file including the policies for the group of computers, the second resource path comprising the root component.

5. The method of claim 1, wherein the first resource path points to a computer system outside the group of computers.

6. The method of claim 1, wherein the rounded time is based on a specified rounding interval.

7. The method of claim 1, wherein identifying any computers within the group of computers comprises searching within the group of computers for the configuration file using the rounded time.

8. The method of claim 1, wherein the first resource path is a universal resource locator (URL).

9. The method of claim 1, further comprising validating a digital signature of the configuration file before processing the policies included in the configuration file.

10. A computer system providing for configuration file downloads, the computer system comprising:
    a processor;
    memory in electronic communication with the processor;
    instructions stored in the memory, the instructions being executable to:
        build a first resource path, the first resource path comprising a root component, a group component, and a time component based on a rounded time, wherein the rounded time is based on an interval relative to the current time;
        identify any computer systems within a group of computer systems that have previously downloaded or are currently downloading a configuration file stored at the first resource path for the rounded time;
        if one of the computer systems is identified, obtain a copy of the configuration file stored at the first resource path from the identified computer system; and
        if one of the computer systems is not identified:
            request the configuration file for the rounded time from a source, the source generating the configuration file stored at the first resource path based on policies for the group of computer systems identified by the group component; and
            download the configuration file stored at the first resource path generated by the source utilizing the identified policies.

11. The system of claim 10, wherein the instructions are further executable to process the policies included in the configuration file.

12. The system of claim 10, wherein the root component identifies a location at the source.

13. The system of claim 10, wherein a processing application located at a second resource path is requested to generate the configuration file including the policies for the group of computer systems, the second resource path comprising the root component.

14. The system of claim 10, wherein the first resource path points to a computer system outside the group of computer systems.

15. The system of claim 10, wherein the instructions are further executable to process the policies included in the configuration file.

16. The system of claim 10, wherein the rounded time is based on a specified rounding interval.

17. The system of claim 10, wherein the instructions executable to identify any computer systems within the group of computer systems comprise instructions executable to search within the group of computer systems for the configuration file using the rounded time.

18. A non-transitory computer-readable medium comprising executable instructions providing for configuration file downloads, the instructions being executable to:

build a first resource path, the first resource path comprising a root component, a group component, and a time component based on a rounded time, wherein the rounded time is based on an interval relative to the current time;

identify any computer system within a group of computer systems that have previously downloaded or are currently downloading a configuration file stored at the first resource path for the rounded time;

if one of the computer systems is identified, obtain a copy of the configuration file stored at the first resource path from the identified computer system; and if one of the computer systems is not identified:
request the configuration file for the rounded time from a source, the source generating the configuration file stored at the first resource path based on policies for the group of computer systems identified by the group component; and download the configuration file stored at the first resource path generated by the source utilizing the identified policies.

19. The computer-readable medium of claim 18, wherein the instructions are further executable to process the policies included in the configuration file.

20. The computer-readable medium of claim 18, wherein the root component identifies a location at the source.

21. The computer-readable medium of claim 18, wherein a processing application located at a second resource path is requested to generate the configuration file including the policies for the group of computer systems, the second resource path comprising the root component.

* * * * *

UNITED STATES PATENT AND TRADEMARK OFFICE
CERTIFICATE OF CORRECTION

PATENT NO.        : 8,601,542 B1
APPLICATION NO.   : 12/341756
DATED             : December 3, 2013
INVENTOR(S)       : David A. Eatough Page 1 of 1

It is certified that error appears in the above-identified patent and that said Letters Patent is hereby corrected as shown below:

In the Specification

In column 4, line 47 delete "subnet 1226" and replace it with --subnet I 226--.

Signed and Sealed this
Twentieth Day of May, 2014

Michelle K. Lee
*Deputy Director of the United States Patent and Trademark Office*